Feb. 15, 1938.       R. B. BURTON       2,108,524
COMBINED SHOCK ABSORBER AND ANTIROLL DEVICE
Filed Sept. 26, 1934
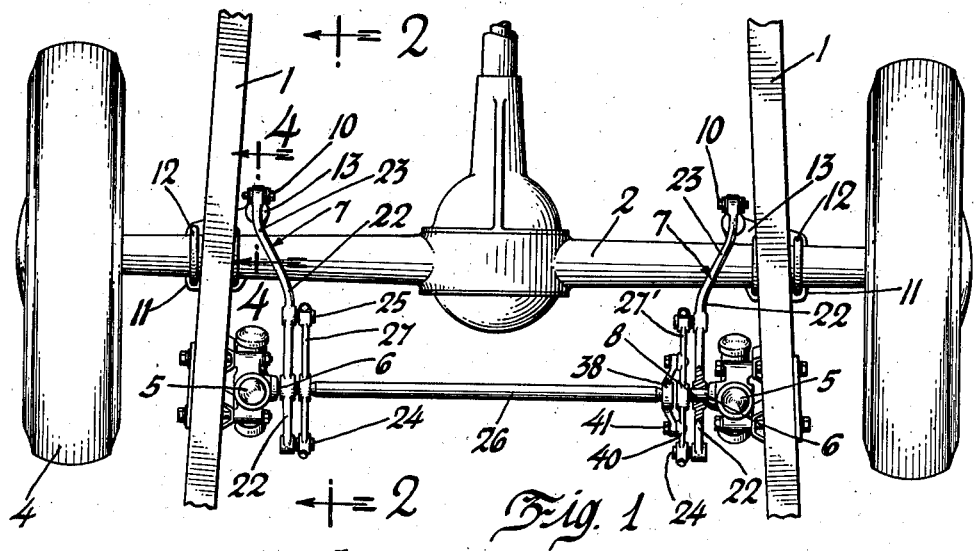
Fig. 1
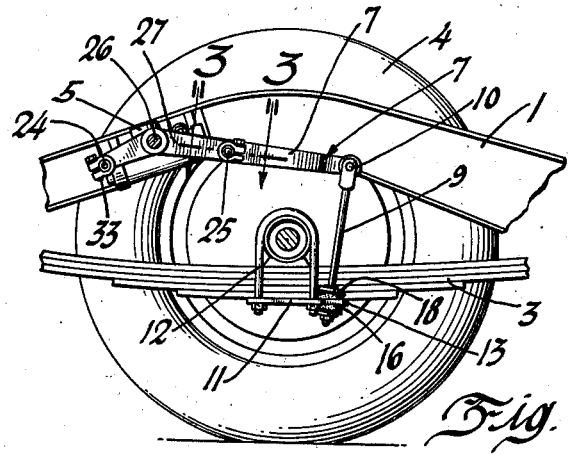
Fig. 2
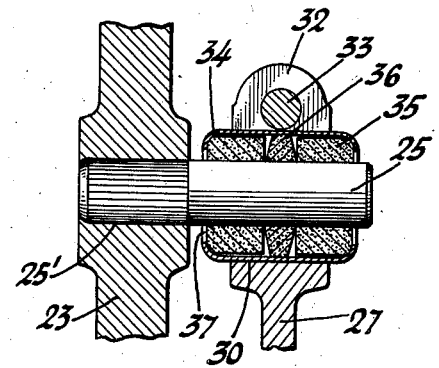
Fig. 3
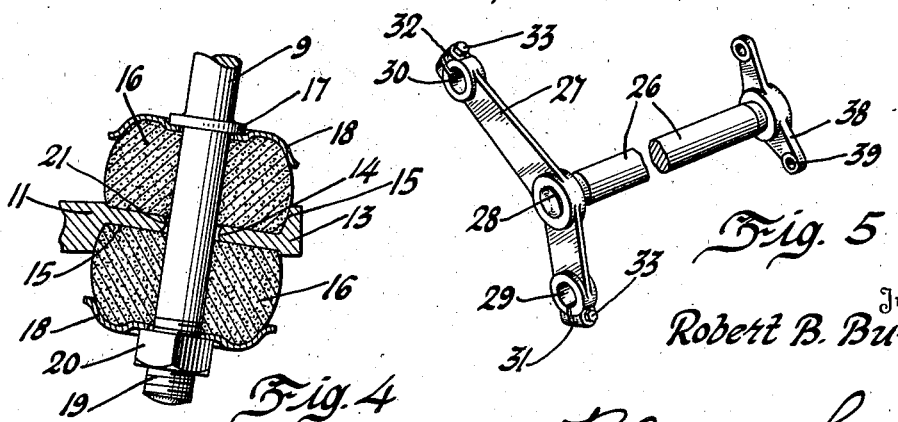
Fig. 4
Fig. 5
Inventor
Robert B. Burton
By Blackmore, Spence & Flint
Attorneys Patented Feb. 15, 1938

2,108,524

UNITED STATES PATENT OFFICE 2,108,524

COMBINED SHOCK ABSORBER AND ANTI-ROLL DEVICE

Robert B. Burton, Detroit, Mich., assignor to General Motors Corporation, Detroit, Mich., a Corporation of Delaware Application September 26, 1934, Serial No. 745,505

2 Claims. (Cl. 267—11)

This invention relates broadly to apparatus providing smoother riding qualities in vehicle bodies, and more specifically to a device to connect the rear shock absorber arms together to transmit the action of one to the other to prevent body roll.

With the present use of different types of wheel suspension, and especially with independent front wheel suspension in motor cars, it has been the tendency to make the rear springs softer or more flexible. However, when this was done a decided body roll or list was present when the car turned corners or went around curves. It is an object of this invention to provide means to counteract this roll. It is a further object to provide simple, easily constructed and assembled apparatus to accomplish the above result.

For a better understanding of the nature and objects of this invention, reference is made to the following specification, wherein there are described the embodiments of my invention which are illustrated in the accompanying drawing, in which:

Figure 1 is a partial top plan view of the rear section of an automobile chassis with my invention affixed thereto.

Figure 2 is a vertical sectional view taken on line 2—2 of Figure 1.

Figure 3 is an enlarged sectional view taken on the line 3—3 of Figure 2.

Figure 4 is an enlarged sectional view taken on the line 4—4 of Figure 1.

Figure 5 is a perspective view of the tie rod assembly of my invention.

The two longitudinal side frame members 1 of a vehicle frame are supported on a rear axle assembly 2 by semi-elliptical springs 3 in the conventional manner. The wheels 4 support the axle from the road. A shock absorber 5 is supported on each side frame member and has an operating shaft 6 projecting toward the center of the frame. An actuating arm 7 for the shock absorber has an opening 8 spaced from one end which is adapted to fit on the shaft 6 and be firmly secured thereto, the shorter end of the arm projecting toward the rear of the vehicle. The longer forward portion of the arm is pivotally connected to a substantially vertical rod 9 by a suitable pin connection 10. The plate 11 through which the lugs of the U-bolt 12 project to support the spring 3 on the axle are roughly rectangular but have a projecting rear portion 13 through which a hole 14 is provided to secure the lower end of rod 9. The axis of this hole is tilted and is not at right angles to the plane of the faces of the plate 11 as best shown in Figure 4.

The two opposite faces of the plate are counterbored as shown at 15 at an angle to the faces to support two rubber biscuits 16, one on each side which surround the rod 9. A raised ring 17 on the rod above the plate keeps a metal washer 18 from sliding up the rod and pushes the rubber biscuit down into contact with the counterbore. The lower end of the rod is threaded as at 19 and a nut 20 supports a similar washer 18 against the lower biscuit. The internal edges of the hole 14 are axially rounded as at 21 to allow a certain degree of angular movement of the rod 9.

The actuating arms 7 are substantially horizontal in normal position, the rear portion 22 being at a slight angle to the front portion 23. At the extremity of the portion 22 is drilled a hole into which a pin 24 is pressed. In the longer portion 23 at a slightly greater distance from the shaft 6 than the pin 24 is drilled a second hole 25' and a second pin 25 is press fitted therein. Both of these pins project inwardly of the vehicle.

The stabilizing member itself is formed of a long rod 26 extending from one shock absorber to the other, and having at one end an angled member 27 rigidly secured to the member by being press fitted into a hole 28 therein. The member 27 is of the same shape as the actuating arm 7 between the two pins, and has openings 29 and 30 in the ends thereof opposite the pins. A slot 31 is cut in the periphery of each opening. Raised bosses 32 are formed on the exterior of the periphery adjacent the slot, and a bolt 33 passes through one boss and is threaded into the other to tend to close the slot upon tightening.

A circular metal shell 34 fits snugly within each of the openings 29 and 30. The inner and outer ends of the metal shell are turned inwardly toward the axis of the shell to form enclosing flanges for a series of rubber bushings 35 and 36. Two large rubber bushings 35 occupy the two end positions, and a smaller tapered bushing 36 is positioned between them. These bushings all have a central hole through which the end of the pins 24 and 25 project. The openings 37 in the end of the shell are considerably larger than the pin so that they do not contact them, but the pins are supported solely on the rubber. When the bolts 33 are tightened the shell is clamped within the openings 29 and 30.

The opposite end of the rod 26 is secured to a smaller angle arm 38 by a press fit into a central hole therein similar to the connection on the first mentioned end. The two ends that extend in opposite directions from the central connection are at a slight angle to each other, and each has a hole 39 therein. To the shock absorber on this side is secured an angled arm 27' which is practically identical to the arm 27. It is secured to the shock absorber arm in the same manner as the arm 27. The only difference between 27 and 27' is that the latter has two spaced raised bosses 40, one on each arm between the central opening and the openings 29 and 30. These bosses are drilled and tapped and cap screws 41 inserted through the openings 39 in the arm 38 are threaded into these holes to secure the assembly together.

The object of using the small angle arm 38 instead of connecting the end of the rod 26 directly to the arm 27' is to make the device capable of being mounted, since the pins 24 and 25 are secured in the shock absorber arms before the device is applied. To apply the stabilizer the two rubber bushings in the arm 27 are pushed over the pin ends, the bolts 33 being drawn tight on the shell. The arm 27' is next applied independently to the pins on that side and then the arm 38 is secured thereto by swinging it up parallel and inserting cap screws 41 and tightening the same. It should be noted that when the stabilizer is in place the holes 28 are directly in line with the shock absorber shafts and therefore the axis of the rod 26 is coincidental with that of the shafts.

In operation, when the car goes around a corner to the left, the frame on the right side will press down and the shock absorber arm will rotate around the shaft of the absorber. This, of course, carries with it the arm 27' which will tend to rotate the rod 26. The torsional stress in the rod will tend to rotate the arm 27 and the absorber arm on the other side which will pull down the frame to a certain extent on that side. It will be evident, therefore, that each time one side of the car goes down the other side will also be pulled down, which action will tend to keep the car on an even level and prevent body roll.

I claim:

1. A stabilizer for use in a vehicle chassis having semi-elliptic spring suspension upon an axle, shock absorbers secured to the chassis on opposite sides, operating shafts projecting from the shock absorbers, actuating arms secured to the shafts intermediate their ends, means securing one end of the arms to the axle, pins projecting from the arms at spaced points, one on each side of the shaft connection, parallel members spaced from the arms and connected thereto through resilient means which contact the pins, a second shorter member rigidly secured to the parallel member on one side only and a rod connecting the end of this last mentioned member to the parallel member on the opposite side.

2. A stabilizer for use in a vehicle chassis having spring suspension upon an axle, shock absorbers secured to the chassis on opposite sides, actuating arms for the shock absorbers secured to the axle, a rod having inherent torsional resiliency, arms secured to the ends of the rod and paralleling the first named arms and resilient means interconnecting the two sets of arms at spaced points.

ROBERT B. BURTON.